F. KUGLER.
BOOK SEWING MACHINE.
APPLICATION FILED MAY 5, 1910.

1,062,596.

Patented May 27, 1913.

6 SHEETS—SHEET 1.

Witnesses:
B. Sommers
May Ellis

Inventor:
Friedrich Kugler,
By Henry Ott Jr.
Atty.

COLUMBIA PLANOGRAPH CO., WASHINGTON, D. C.

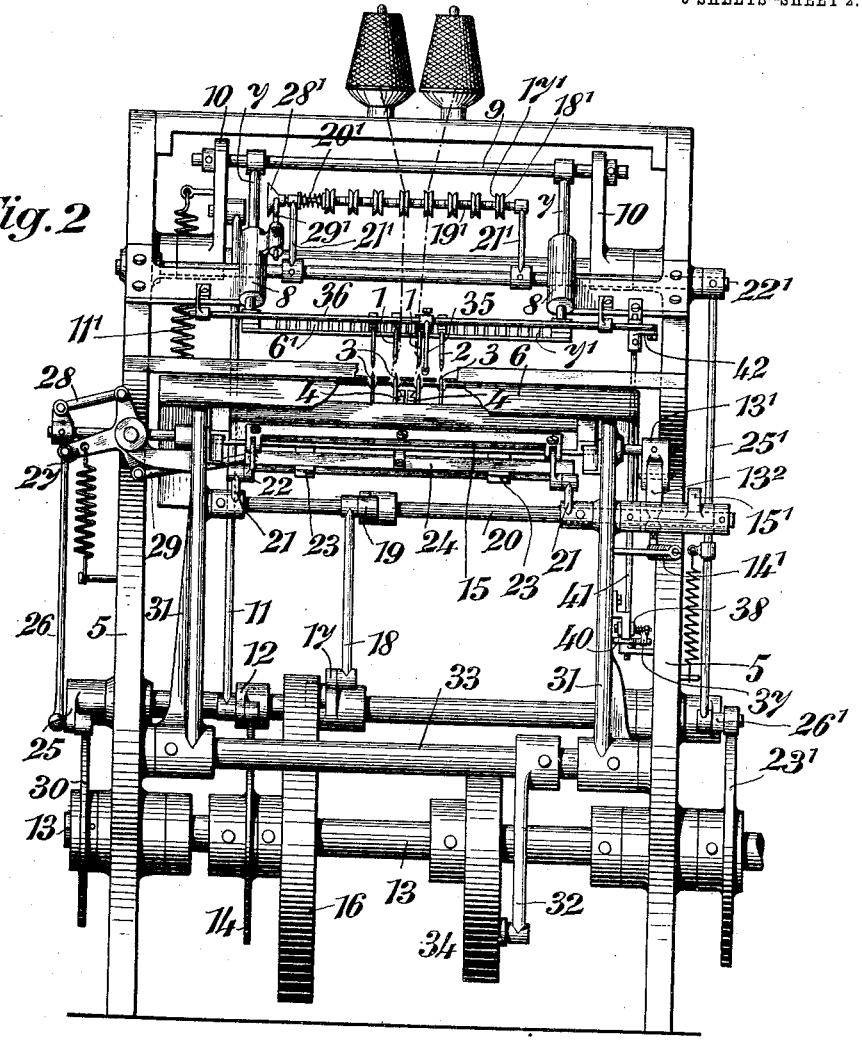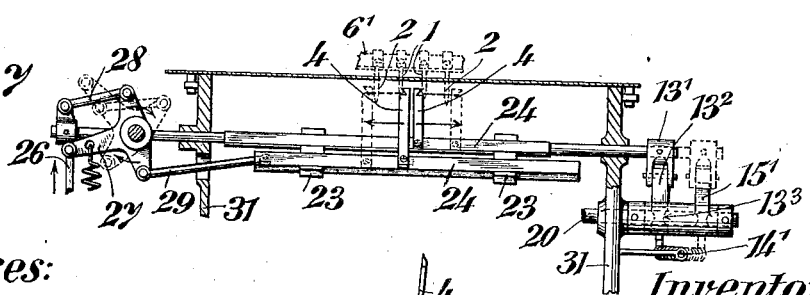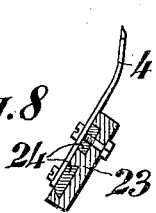

F. KUGLER.
BOOK SEWING MACHINE.
APPLICATION FILED MAY 5, 1910.
1,062,596.
Patented May 27, 1913.
6 SHEETS—SHEET 3.
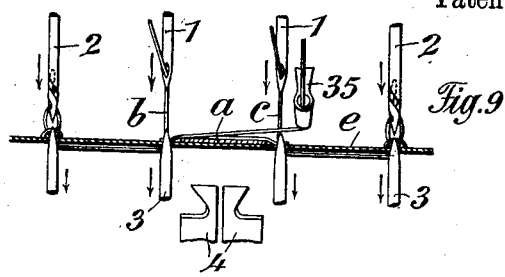
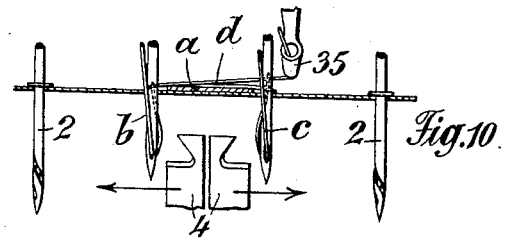
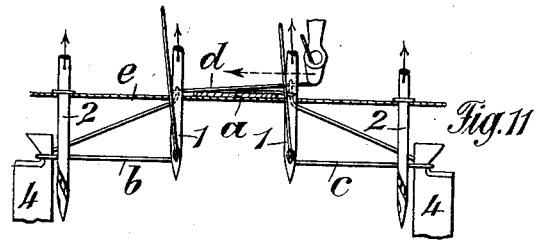
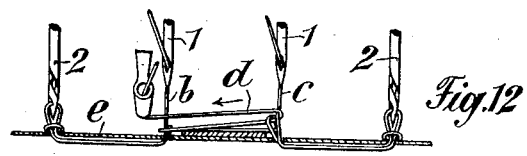
Witnesses:
B. Dommers
May Ellis
Inventor:
Friedrich Kugler,
By Henry Orth
atty.
COLUMBIA PLANOGRAPH CO., WASHINGTON, D. C.

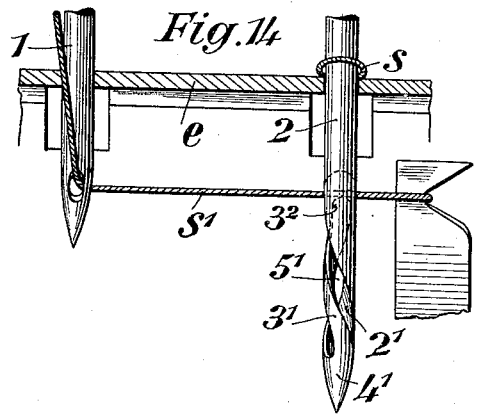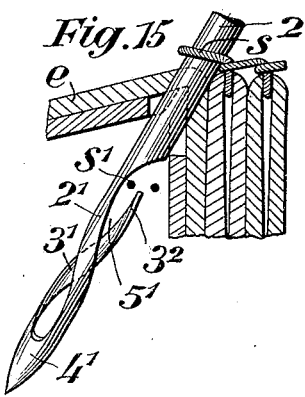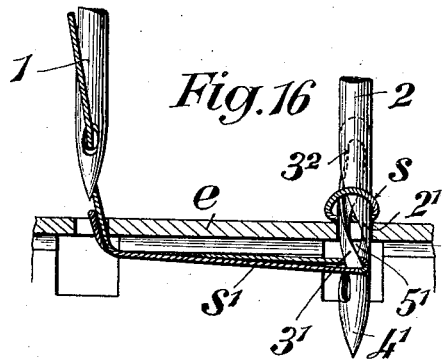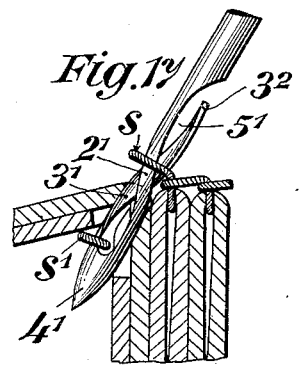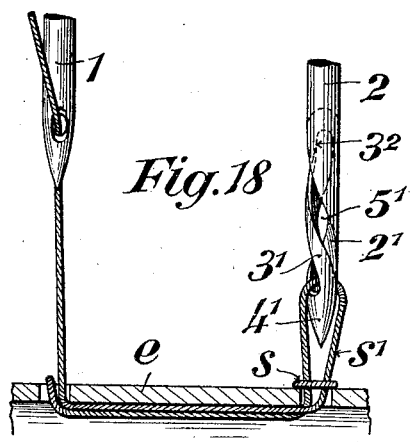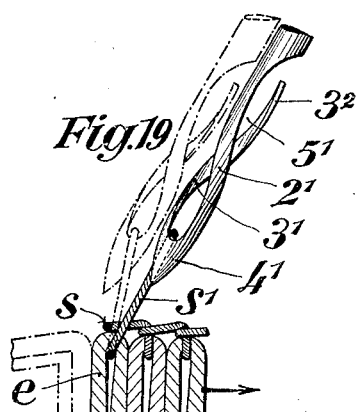

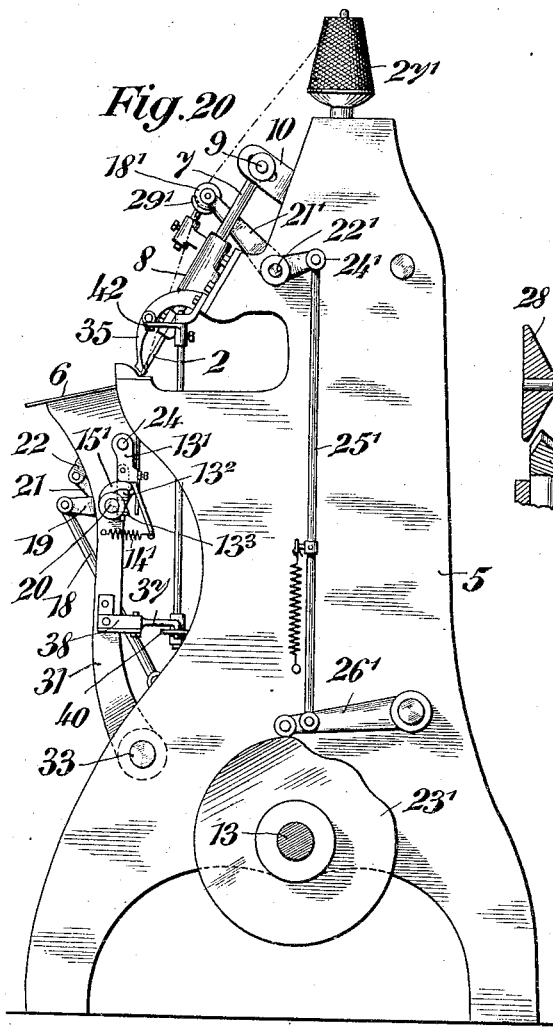
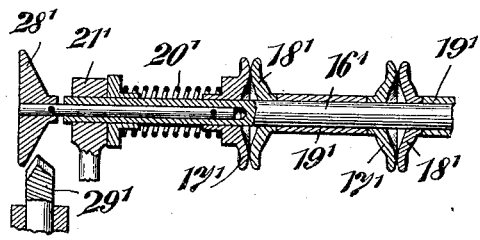
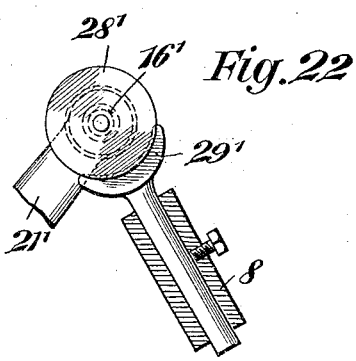
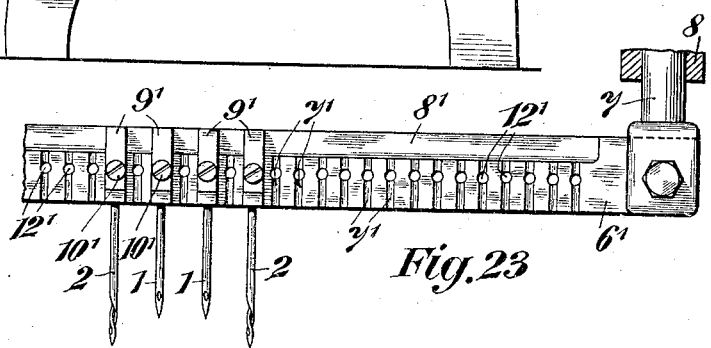
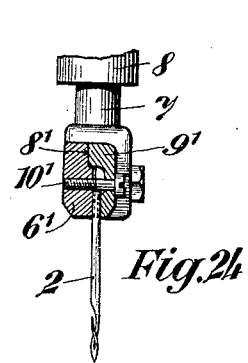

F. KUGLER.
BOOK SEWING MACHINE.
APPLICATION FILED MAY 5, 1910.

1,062,596.

Patented May 27, 1913.
6 SHEETS—SHEET 6.

Witnesses:
B. Dommers
May Ellis

Inventor:
Friedrich Kugler.
By Henry Ortt
Atty.

UNITED STATES PATENT OFFICE.

FRIEDRICH KUGLER, OF FRAUENFELD, SWITZERLAND, ASSIGNOR TO MARTINI-BUCHBINDEREI & TEXTILMASCHINENFABRIK A.-G., OF FRAUENFELD, SWITZERLAND.

BOOK-SEWING MACHINE.

1,062,596.   Specification of Letters Patent.   Patented May 27, 1913.

Application filed May 5, 1910. Serial No. 559,508.

*To all whom it may concern:*

Be it known that I, FRIEDRICH KUGLER, a subject of the Emperor of Germany, residing at Neuhauserstrasse, Frauenfeld, Switzerland, have invented certain new and useful Improvements in Book-Sewing Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The subject of my invention is a book-sewing machine, provided with sewing and with hooked needles, with piercers and loop-takers, and with a device for sewing on a binding band.

One practical embodiment of the invention is illustrated in the accompanying drawings, in which:—

Figure 1:
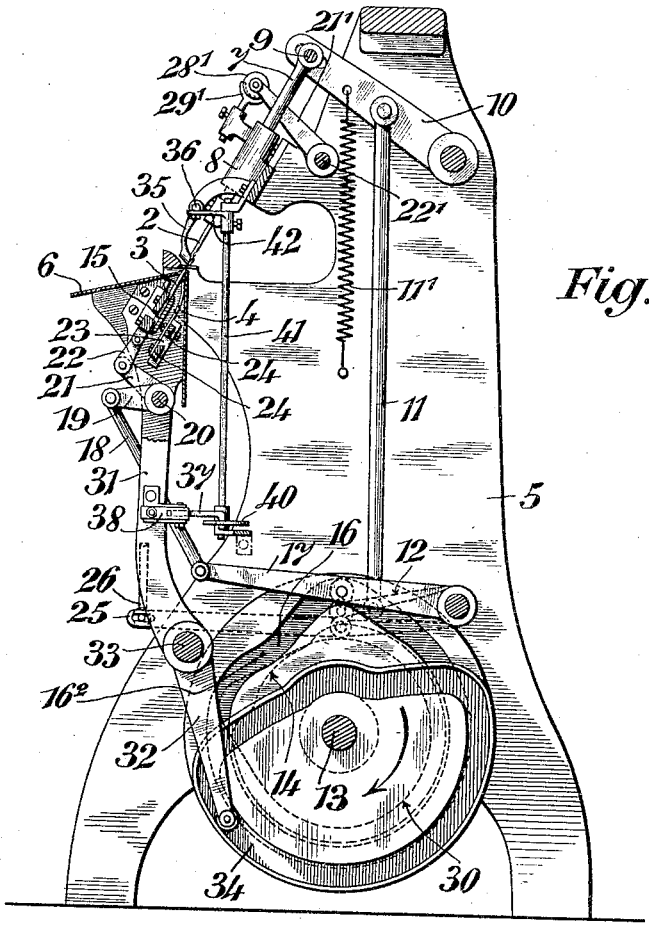

Figure 1 is a vertical section, and Fig. 2 a front elevation of the machine. Figs. 3 to 6 are sectional views showing details of the band sewing-device mechanism. Figs. 7 and 8 show portions of the loop-taker mechanism. Figs. 9 to 13 illustrate the successive steps in the procedure of sewing on a band. Figs. 14 to 19 illustrate at a much enlarged scale the successive steps in the formation of a chain-stitch. Fig. 20 is an end elevation of the machine. Figs. 21 and 22 show details of the tension-device. Figs. 23 and 24 show a portion of the needle-bar with sewing and hooked needles. Figs. 25 to 28 illustrate details of the loop-taker mechanism.

The machine illustrated is provided with two sewing needles 1, and two hooked needles 2 located one at each side thereof; furthermore, with four piercers 3, which stab holes in the quires or signatures to be sewn, for the purpose of admitting the needles 1, 2; also with two loop-takers 4, which seize the loop of thread formed at the sewing needles 1, draw it out, and convey it to the hooked needles 2, which carry up the loops of thread in order to form the chain-stitch on the back of the quires. The needles 1 and 2 are mounted on the stationary machine-frame 5 above a vibratory roof-shaped table 6, while the piercers 3 and loop takers 4 are mounted below the table 6.

The needles 1 and 2 are secured to a common bar $6^1$, which extends along the machine and is supported by two rods 7, sliding in fixed guides 8 projecting from the frame 5 (Figs. 1 and 2). The rods 7 are mounted on a common rod 9, which is carried by two levers 10. To the one lever 10 there is jointed a rod 11, the lower end of which is connected to a lever 12, carrying a roller, which bears upon the periphery of a cam 14, mounted on the shaft 13. The lever 10 is actuated by a spring $11^1$, the lower end of which is attached to the frame of the machine (Figs. 1 and 2).

On the front of the bar $6^1$ (Figs. 23 and 24) vertical grooves $7^1$ are provided to receive the needles 1 and 2; also a longitudinal rabbet $8^1$ to accommodate the clamping-pieces $9^1$ by which the needles are held to the bar. These clamps are grooved on the underside, so as to take over the needles, and are secured by screws $10^1$, fitting into threaded holes $12^1$. There is a hole $12^1$ provided at each groove $7^1$, and there may be fewer clamps $9^1$ than grooves $7^1$; being interchangeable, the clamps can be secured over any grooves desired and the needles thus arranged at any required distance apart. The clamps may be made very narrow, so that the grooves $7^1$ may be located quite close together, and the needles 1, 2 thus disposed in much greater proximity than has hitherto been possible in prior machines having needles carried by a guided bar. This arrangement admits of even the smallest quire being provided with several stitches.

Figure 25:
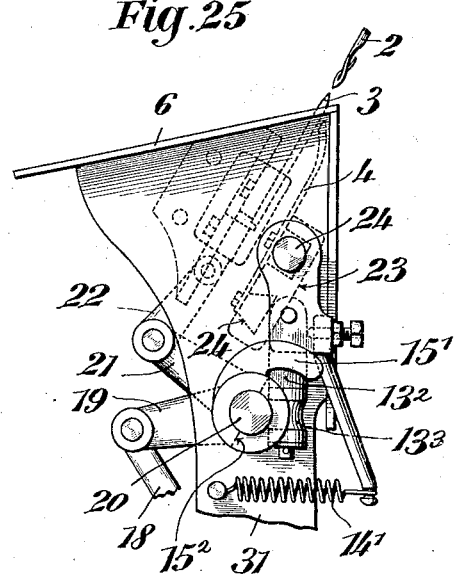
Figure 26:
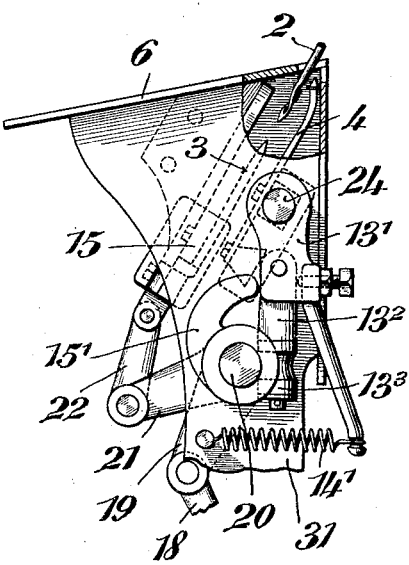
Figure 28:
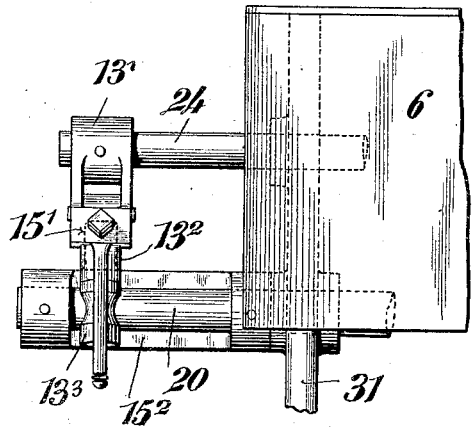

The piercers 3 are secured to a bar 15, located below the table 6. They receive their motion from a cam 16, mounted on the shaft 13, by means of members 17, 18, 19, 20, 21, 22, whereby they are moved to and from the needles 1 and 2 (Figs. 1 and 2). Of the two loop-takers 4, the one is secured to a rocking bar 24, which slides in the arms 31 of the table 6; while the other loop-taker is secured to a bar 24, which is located parallel to the first said bar 24 and slides in guides 23 attached to the latter. The two bars 24 receive their counter reciprocatory motion by means of a spring actuated lever-system 25, 26, 27, 28, 29, and a cam 30 mounted on the shaft 13 (Figs. 1, 2, 7 and 8). In addition to their reciprocatory motion the two loop-takers 4 also receive a simultaneous and like vibratory motion in a direction toward the hooked needles 2, for the purpose of enabling the transference of the seized loops to the needles 2. This vibratory motion is received from the rocking shaft 20 for the piercers. For this purpose an arm $13^1$ is mounted on the upper bar 24, and a member $13^2$ carrying a roller $13^3$ is provided on the said arm. On the shaft 20 there is also mounted a wiper $15^1$, the boss of which is removed at $15^2$, so that the shaft 20 is exposed over a considerable length (Figs. 1, 7, 20, 28). Against this exposed portion of the shaft there bears the roller $13^3$ of the arm $13^1$, actuated by the spring $14^1$. In this manner the bars 24 receive guidance, that is to say, the arm $13^1$ in this position prevents unintentional rotation of the bars 24 and loop-takers (Figs. 25 and 26).

The quire to be secured is laid upon the table 6, and after the piercers 3 have stabbed the holes, they retire downward again; but before being shifted in horizontal direction they are moved somewhat upward, the roller on the arm 17 running on the part $16^2$ of the groove in the cam 16. During the slight rotation of the shaft 20 thus resulting, the wiper $15^1$ will strike the arm $13^1$ in front of it (Fig. 26) and will turn it backward. The loop-takers 4 will thus be swung forwardly and will bring the drawn-out loops up to the hooked needles 2 (Figs. 27, and 14, 15), so that on the upward motion of the latter the loops will be seized and carried up.

The table 6 is carried by two oscillatory arms 31, which together with an arm 32, are mounted on a common shaft 33; and it receives its vibratory motion from a cam 34 of the shaft 13, actuating the arm 32 (Figs. 1 and 2).

For stretching tight the needle-thread a tension-device is provided. This consists of pairs of tension-disks $17^1$, $18^1$ mounted on a rod $16^1$, and spaced apart by sleeves $19^1$, and held together by a helical spring $20^1$. The tension-disks are loosely mounted on the rod $16^1$, with the exception of the disk $17^1$ on the extreme left (Figs. 1 and 21), which is fixed on the rod. The latter is supported by two levers $21^1$ (Fig. 2) mounted on a shaft $22^1$, which has its bearings in the frame 5. The rod receives a vibratory motion from a cam $23^1$ secured to the driving shaft 13, by means of a spring-actuated lever-system $24^1$, $25^1$, $26^1$. In this manner the rod $16^1$ with the tension-disks $17^1$, $18^1$ is moved up and down in the direction of the threads which run from the bobbins $27^1$ to the needles 1.

At the left hand end of the rod $16^1$ there is secured a conical disk $28^1$ (Figs. 2 and 21), which coöperates with a crescent-shaped stop $29^1$ (Fig. 22), adjustably secured in a guide 8.

When the levers $21^1$ with the rod $16^1$ swing downward from their upper position, the threads, guided between the pairs of tension disks $17^1$, $18^1$, and gripped thereby, will be drawn from the bobbins $27^1$ toward the needles 1. Toward the end of the downward motion of the rod $16^1$, the conical face of the disk $18^1$ strikes the stop $29^1$, whereby the said rod $16^1$ will be shifted against the action of the spring $20^1$, the disks $17^1$, $18^1$ thus releasing the threads. Hereupon the stitches are made; when these are finished, the rod $16^1$ will be again moved upward, the disk $28^1$ leaves the stop $29^1$, and the threads will be again gripped by the disks $17^1$, $18^1$, owing to the action of the spring $20^1$, whereby the portions of the threads which run to the needles will be drawn taut, that is, the stitches tightened.

Each needle 2 presents a hook, consisting of two shanks $2^1$, $3^1$, united at their base which forms the point $4^1$ of the needle, a space $5^1$ being left between them. The lower part of the needle, constituting the point portion $4^1$, is twisted at an angle of 180° to the upper part, which presents the end $3^2$ of the hook, in such manner that the two shanks $2^1$, $3^1$ run helically (Figs. 14 and 15).

The method of forming the chain-stitches, that is to say, sewing a number of quires together, will be understood from the following, which describes the operation of a sewing- and a hooked needle, reference being made to Figs. 14 to 19.

Figure 27:
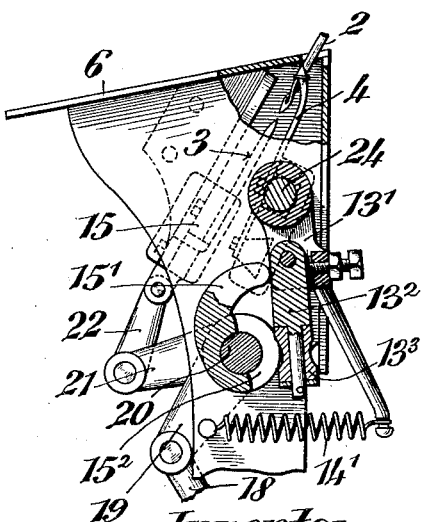

When the table 6 has swung inwardly, into the position shown in Figs. 1 and 2, the needles 1 and 2 enter the holes made in the quire $e$ by the piercers 3, whereupon the loop-taker 4 seizes the loop $s^1$ formed at the needle 1, and draws it up to the hooked needle 2 in horizontal direction. Hereupon the loop-taker, swinging forwardly, will lay the one stretch of the loop $s^1$ in the needle 2 above the hook end $3^2$ (Figs. 14, 15 and 27). When, therefore, the needles 1 and 2 are again moved upward, the thread will enter the space $5^1$, and on being released by the loop taker 4 will lay itself around the limb $3^1$ (Figs. 16 and 17). On further upward motion of the needles 1, 2 the loop $s^1$ will naturally be carried upward also, and the needle 2, entering the loop $s$ formed around it at the preceding stitch, will make the chain-stitch (Figs. 18 and 19). The table 6 after swinging outward, and receiving a new quire, is again swung inward, and the sewed quire $e$ will be shifted opposite the needle 2, so that the loop $s^1$ now lies around the needle shank $2^1$ (broken-line position, Fig. 19). When the needles 1 and 2 are now moved downward again, that is to say, pushed into the new quire, the loop $s^1$ will still remain lying around the needle 2, so that when a new loop is placed in the hooked needle 2 and the latter raised, this new loop will be drawn through the preceding loop $s^1$, wherefore a new chain-stitch will be formed.

On ascent of the hooked needle 2 with the loop, and on the latter being drawn through the loop laid around the needle at the previous stitch, this loop will not be seized by the hook of the needle 2, since the hook end $3^2$ is turned toward the open side of the loop, lying above the paper (Figs. 16 and 17).

Figure 3:
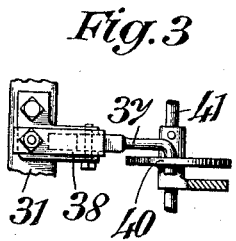

The machine is also provided with a device, whereby simultaneously with the sewing of the quires, cords can be fastened to the backs of the latter. This device possesses a thread-guide 35, having a thread-eye (Figs. 1, 2 and 6), the function of which is to guide the overcasting-thread in a sinuous path above the band which is laid between the stitches, made by the needle 1, on the back of the quires, in such manner that this thread connects the stitch made by the one needle 1 with the following one made by the other needle 1. For this purpose the thread-guide 35 is secured to a rod 36 reciprocating longitudinally of the table, and which is guided on the frame 5 and receives its motion from the table 6. To the one arm 31 of the table there is pivoted a finger 37 (Figs. 3–5), which is held in horizontal position by two spring-actuated plates 38 between which it is located. This finger, on inward oscillation of the table 6, acts on a disk 40. This disk presents two recesses 39, $39^1$ and is secured to a rotatable shaft 41, mounted vertically in the frame 5 and provided with an arm 42, that is connected with the rod 36. The walls 43, $43^1$ of the recesses 39, $39^1$ are located substantially at right angles to each other and form inclined tracks for the finger 37 (Figs. 3–5).

Figure 4:
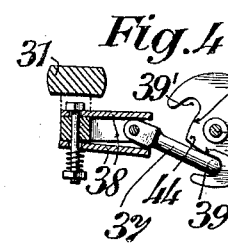

When the table 6 swings inward, the finger 37 will strike, for instance, the wall 43, and, sliding along it, will enter the recess 39 and rotate the disk 40 in the direction of the arrow, Fig. 4. Owing to the coöperation of the parts 41, 42, 36 the thread-guide 35 will thus be shifted in the one direction above the table 6. The finger 35, which during the rotation of the disk 40 leaves its central position and assumes an inclined position, will, on outward swinging of the table 6, again take up its central position of rest, under the action of the spring-controlled plates 38.

Figure 5:
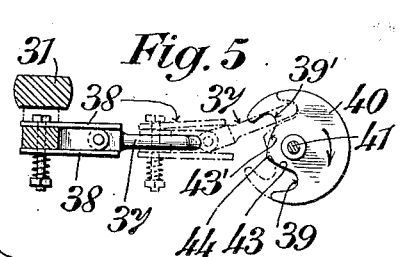
Figure 6:
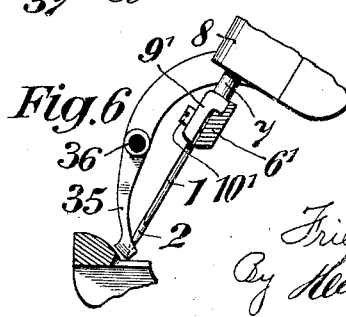

The disk 40 has been turned by the finger 37 through such distance that on completion of the rotary motion, the point 44 lies beyond the path of the finger 37, in the position shown in Fig. 5, so that on the next inward swinging of the table 6 the finger will strike the wall $43^1$, and sliding along it, enter the recess $39^1$ and turn the disk 40 in the direction of the arrow, Fig. 5. In this way, the thread-guide 35 will be moved in the opposite direction above the table 6 to that in which it previously traveled. Thus the disk 40 at each inward oscillation of the table 6 will be turned alternately first in one and then in the other direction, the thread-guide 35 being thus always reciprocated to and fro.

I will now proceed to describe the procedure of fastening a band by overcasting, reference being made to Figs. 9–13. $a$ is the band or tape, $b$, $c$, the two sewing-threads carried by the needles 1, and $d$ the overcasting-thread.

$e$ (Fig. 13) represents the various quires which have been sewed together.

Let us assume that a quire has been sewed in the manner already above described, so that the hooked needles 2 are again in their upper position and the thread-loops, seized by their hooks, have been drawn through the loops of the previous stitch. The thread-guide 35 will now occupy the position shown in Figs. 9–11. The table 6 will now be swung out and in, for the purpose of receiving a new quire, while the needles 1 and 2 remain in the position shown in Fig. 12. On the inward oscillation of the table, the thread-guide 35 will be shifted in the direction of the arrow, Fig. 12, owing to the operation of the disk 40 and finger 37 in the manner above elucidated, whereby the thread $d$ will be laid in loop form (Fig. 12) around the stitches which have been made by the needles 1 which carry the threads $c$. The thread-guide 35 now remains in the position shown in Fig. 12 until new stitches are made by the needles 1 and 2 and the table 6 is swung out, whereupon, on inward oscillation of the table, the thread-guide 35 is shifted in the opposite direction, that is to say, is moved from the position shown in Fig. 12, into that shown in Fig. 9, the thread $d$ being now laid in loop form around the new stitches made by the needles 1; and so forth.

The thread $d$, after each stitch made by the needles, is thus laid alternately first around the stitch of the one needle 1 and next time around the stitch of the other needle 1, in sinuous form, as shown in Fig. 13; and in this manner the tape $a$ is fastened to the backs of the sewed quires $e$ between the threads $b$, $c$, $d$.

Having now particularly described and ascertained the nature of the said invention and in what manner the same is to be performed, I declare that what I claim is:

1. In a book-sewing machine, the combination with a signature support, of a sewing needle, a non-rotatable needle having a permanently open helical hook twisted through an angle of substantially 180 degrees relatively to the end of the needle, means to extend the thread in a loop from the sewing needle into the path of said hook, and means to move the needles rectilinearly through the signature.

2. In a book-sewing machine, the combination with a signature support, of a sewing needle, a non-rotatable needle having a permanently open helical hook twisted through an angle of substantially 180 degrees relatively to the end of the needle, the free end of said hook lying in the cylindrical contour of the needle, and means to extend the thread in a loop from the sewing needle into the path of said free end.

3. In a book-sewing machine, the combination with a signature support, of a sewing needle, a non-rotatable needle having a permanently open helical hook twisted through an angle of substantially 180 degrees relatively to the end of the needle, a needle bar, means for detachably securing the needles directly thereon, and rods carrying said bar reciprocally mounted in the machine frame to move the needles rectilinearly through the signature.

4. In a book-sewing machine, the combination with a signature support, of one reciprocable needle-bar extending substantially the whole length of and parallel to said support and having a plurality of transverse grooves formed therein, throughout the whole length of the bar, adapted to receive the sewing needles and hooked needles, and clamping plates for holding the needles in the grooves, the width of said clamping plates being such that they cover only one groove.

5. In a book-sewing machine, the combination with a signature support, of a reciprocable needle-bar having a plurality of transverse grooves formed therein adapted to receive the sewing needles and hooked needles, and clamping pieces adapted to fit into a longitudinal rabbet formed in the bar above the grooves and to extend over the latter, and means to detachably connect the clamping pieces to the bar whereby the needles are held in the grooves.

6. In a book-sewing machine, the combination with a stitch-forming mechanism, of a tension device comprising a rod, means to move the latter transversely to its longitudinal axis to and from said mechanism, members on the rod adapted to grip the thread, stationary means to co-act with the rod to shift the latter axially at the end of its movement toward said mechanism to cause said members to release the thread, and means to shift the rod to its normal axial position during its movement from the mechanism to cause said members to grip the thread.

7. In a book-sewing machine, the combination with a chain-stitch forming mechanism, of a tension device comprising a rod, means to move the latter transversely to its longitudinal axis to and from said mechanism, a conical member on the rod, a stationary member adapted to engage the conical member in the movement of the latter toward said mechanism whereby said rod is shifted axially, and gripping disks on the rod adapted to be separated during the engagement of the conical and stationary members, and means on the rod to hold the disks together during the disengagement of the conical and stationary members.

8. In a book-sewing machine, the combination with a chain-stitch forming mechanism, of a tension device comprising a rod, means to move the latter transversely to its longitudinal axis to and from said mechanism, a conical member on the rod, a stationary member adapted to engage the conical member in the movement of the latter toward said mechanism, whereby said rod is shifted axially, and gripping disks on the rod adapted to be separated during the engagement of the conical and stationary members, and a spring on the rod to hold the disks together during the disengagement of the conical and stationary members.

9. In a book-sewing machine, the combination with a signature support, of piercers, means to reciprocate the latter through the signatures, a sewing needle, a hooked needle, means to reciprocate the needles through the signature, horizontally movable looping members, means to reciprocate the latter, and means actuated by the piercer operating mechanism to oscillate the looping members.

10. In a book-sewing machine, the combination with a signature support, of a plurality of piercers movable through the signatures, a rock-shaft to actuate the piercers, sewing needles and hook-needles movable through the signature, looping members, means to reciprocate the latter between the sewing needles and the hooked needles, a wiper on the rock-shaft, and an arm connected with the reciprocating means adapted to be engaged by the wiper to move the looping members to the hooked needles.

11. In a book-sewing machine, the combination with a signature support, of a plurality of piercers movable through the signatures, a rock-shaft to actuate the piercers, sewing needles and hook-needles movable through the signature, looping members, means to reciprocate the latter between the sewing needles and the hooked needles, a wiper on the rock-shaft, a spring actuated arm, and a roller journaled in the latter normally bearing on the rock-shaft whereby the rotation of the latter advances the looping members to the hooked needles.

12. In a book-sewing machine, the combination with a chain-stitch forming mechanism, and a signature support, of means for vibrating the latter, an overcasting thread-guide, and means operated by the vibrating means to reciprocate the thread guide, whereby an overcasting thread is wound in a sinuous path around the threads of the chain-stitch, for the purpose specified.

13. In a book-sewing machine, the combination with a chain-stitch forming mechanism, and a signature support, of means for vibrating the latter, an overcasting thread-guide, a rock-shaft connected with the latter, and mechanism operated by the forward movement of the vibrating means to rock the shaft alternately to the left and right, for the purpose specified.

14. In a book-sewing machine, the combination with a signature support, of means for vibrating the latter, sewing needles and hooked needles, means to reciprocate the needles through the signature, looping members, means to reciprocate the latter between the sewing needles and the hooked needles, means to rock the looping members to and from the hooked needles, an overcasting thread-guide, a shaft supporting the latter, a rock-shaft connected with the supporting shaft, a spring actuated finger connected with the vibrating means, and a disk on the rock-shaft having recesses adapted to receive said finger alternately.

In testimony that I claim the foregoing as my invention, I have signed my name in presence of two subscribing witnesses.

FRIEDRICH KUGLER.

Witnesses:
 ERNST FISCHER,
 CARL GUBLER.

Copies of this patent may be obtained for five cents each, by addressing the "Commissioner of Patents, Washington, D. C."